United States Patent [19]

Sonoda

[11] Patent Number: 4,790,401

[45] Date of Patent: Dec. 13, 1988

[54] STEERING FORCE CONTROLLER FOR POWER STEERING APPARATUS

[75] Inventor: Hirotetu Sonoda, Saitama, Japan

[73] Assignee: Jidosha Kiki Co., Ltd., Tokyo, Japan

[21] Appl. No.: 92,221

[22] Filed: Sep. 2, 1987

[30] Foreign Application Priority Data

Sep. 11, 1986 [JP] Japan ................................ 61-214491

[51] Int. Cl.$^4$ ............................................ B62D 5/08
[52] U.S. Cl. ...................................... 180/142; 91/434
[58] Field of Search ....................... 180/142, 143, 141; 91/434, 459

[56] References Cited

U.S. PATENT DOCUMENTS 4,637,484 1/1987 Ijiri et al. ............................ 180/142
4,681,184 7/1987 Suzuki et al. ........................ 180/142

FOREIGN PATENT DOCUMENTS 61-155058 7/1986 Japan ................................. 180/142

Primary Examiner—John A. Pekar
Attorney, Agent, or Firm—Flynn, Thiel, Boutell & Tanis

[57] ABSTRACT

The invention relates to a steering force controller for power steering apparatus which controls a steering force by controlling an oil pressure supplied to an oil pressure reaction chamber of a reaction mechanism. A pressure controlling mechanism which controls the oil pressure supplied to the oil pressure reaction chamber operates to increase a channel area between a reaction passage which communicates with the oil pressure reaction chamber and a feed passage which communicates with the discharge port of a pump and at the same time reduce a channel area between the reaction passage and a discharge passage which communicates with a tank associated with the pump in accordance with a displacement of the spool in one direction which is caused by a solenoid. In this manner, the flexibility in controlling the pressure within the reaction chamber is enhanced. Chambers formed at the opposite ends of the spool valve communicate with the tank and are maintained under a low pressure.

6 Claims, 3 Drawing Sheets

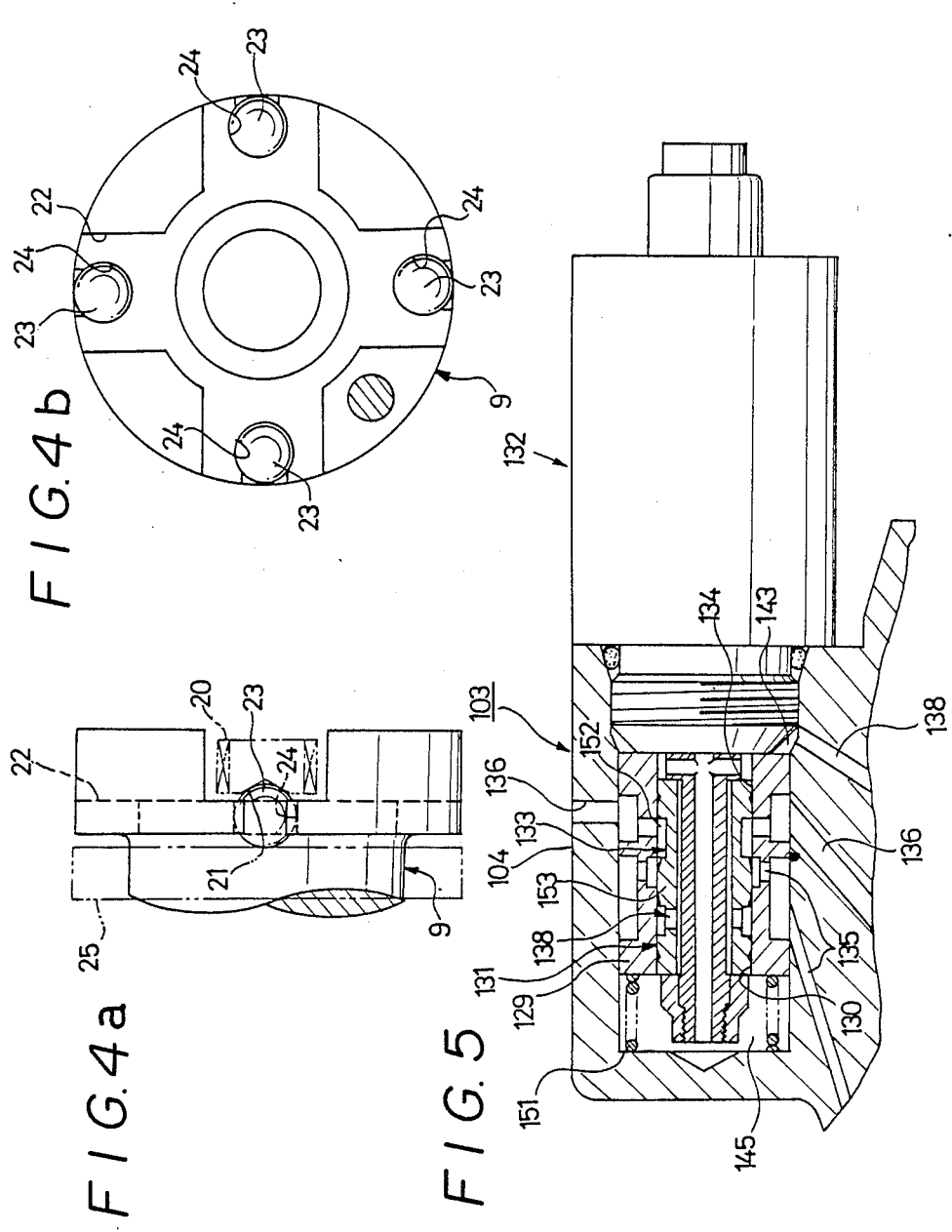

STEERING FORCE CONTROLLER FOR POWER STEERING APPARATUS

FIELD OF THE INVENTION

The invention relates to a steering force controller for power steering apparatus, and more particularly, to such controller in which an oil pressure supplied to an oil pressure reaction chamber of a reaction mechanism is controlled in order to control the steering force.

DESCRIPTION OF THE PRIOR ART

A steering force controller for power steering apparatus is known in the art compressing a servo valve which operates to control the distribution of an oil pressure from a discharge port of a pump to a power cylinder through a relative rotation of a pair of valve members, a reaction mechanism for producing a steering reaction in response to an oil pressure supplied to an oil pressure reaction chamber, and a pressure controlling mechanism for controlling an oil pressure which is supplied to the reaction chamber.

In one form (see Japanese Laid-Open patent application No. 155,060/1986), the pressure controlling mechanism comprises a variable orifice formed in a feed passage communicating the discharge port of the pump with a servo valve and controlling a channel area by a reciprocating displacement of a plunger which is activated by a solenoid. A fluid pressure differential developed across the orifice acts upon a spool valve to cause its reciprocating movement. The position of the spool valve as it moves in a reciprocating manner controls the channel area between the feed passage and the reaction chamber as well as the channel area between the reaction chamber and the tank, thereby controlling the oil pressure within the reaction chamber in order to control the steering force.

In another form (see Japanese Laid-Open patent application No. 105,273/1986), the pressure controlling mechanism includes a solenoid which directly acts upon a spool valve to cause its reciprocating movement, thus controlling the channel area of the feed passage which provides a communication between the discharge port of the pump and the servo valve and also controlling the channel area between the reaction chamber, which communicates with the tank through a fixed orifice, and the discharge port of the pump to thereby control the oil pressure within the reaction chamber and hence the steering force.

The former arrangement becomes complex in construction and requires an increased size because of the need to provide a spool valve which is controlled for a reciprocating movement in accordance with a pressure differential in addition to the plunger which is driven back and forth by the solenoid. Since an oil pressure of a high magnitude is applied to the plunger during the operation of the power steering apparatus, a comparable output of a high magnitude which is capable of opposing such oil pressure is required of the solenoid. This results in an increased size and an increased power dissipation of the solenoid. The high oil pressure is also applied to the solenoid, and hence there arises the need to provide a consideration for the sealing effectiveness of the solenoid to resist such oil pressure.

The latter arrangement does not suffer from these problems, but because the reaction chamber communicates with the tank through the fixed orifice and the oil pressure within the reaction chamber is controlled by controlling the channel area between the chamber and the discharge port of the pump, there remains a problem that the flexibility of the pressure control is limited.

SUMMARY OF THE INVENTION

In view of the foregoing, in accordance with the invention, the pressure controlling mechanism comprises a spool valve which is slidably fitted in a bore formed within a housing, a solenoid connected to the spool valve for causing a reciprocating displacement thereof, low pressure chambers formed at the opposite ends of the spool valve and communicating with a tank associated with the pump, a distribution passage formed around the outer peripheral surface of the spool valve, a feed passage opening into the surface of the housing where the spool valve slide in abutting relationship therewith and communicating with a discharge port of the pump, a reaction passage opening into the surface and communicating with an oil pressure reaction chamber, and a discharge passage opening into the surface and communicating with the tank. The feed passage, the reaction passage and the discharge passage open into the housing surface against which the spool valve slides in the sequential order named as viewed in the axial direction of the spool valve. The distribution passage is constructed so that a channel area between the reaction passage and the feed passage increases while the channel area between the reaction passage and the discharge passage reduces in accordance with a displacement of the spool valve in one direction caused by the solenoid.

With the described arrangement, the reciprocating movement of the spool valve is controlled by the solenoid which is connected therewith, thus simplifying the construction and reducing the size as compared with the first mentioned arrangement. Since the low pressure chambers located at the opposite ends of he spool valve communicate with the tank, and since the feed passage, the reaction passage and the discharge passage open into the surface of the housing against which the spool valve slides, no oil pressure is applied to the spool valve which tends to urge it in one direction. The application of a high pressure to the solenoid is also prevented, allowing the solenoid to be reduced in size and permitting a simplified seal to be used with the solenoid.

In addition, the distribution passage which is formed around the outer peripheral surface of the spool valve increases the channel area between the reaction chamber and the feed passage and reduces the channel area between the reaction chamber and the discharge passage in response to a displacement of the spool valve in one direction caused by the solenoid. Accordingly, the pressure within the reaction chamber which communicates with the reaction chamber is obtained by controlling the channel areas leading to the oil pressure feed side and leading to the oil pressure discharge side. Accordingly, the flexibility in controlling the pressure within the reaction chamber is increased as compared with the second mentioned arrangement.

Above and other objects, features and advantages of the invention will become apparent from the following description of several embodiments thereof with reference to the drawings.

BRIEF DESCRIPTION OF THE DRAWINGS

FIG. 4a is a front view of an end of an output shaft 9 which forms the reaction mechanism 2;

FIG. 4b is a right-hand side elevation of FIG. 4a; and

FIG. 5 is a fragmentary section of another embodiment of the invention.

DETAILED DESCRIPTION OF EMBODIMENTS

Figure 1:
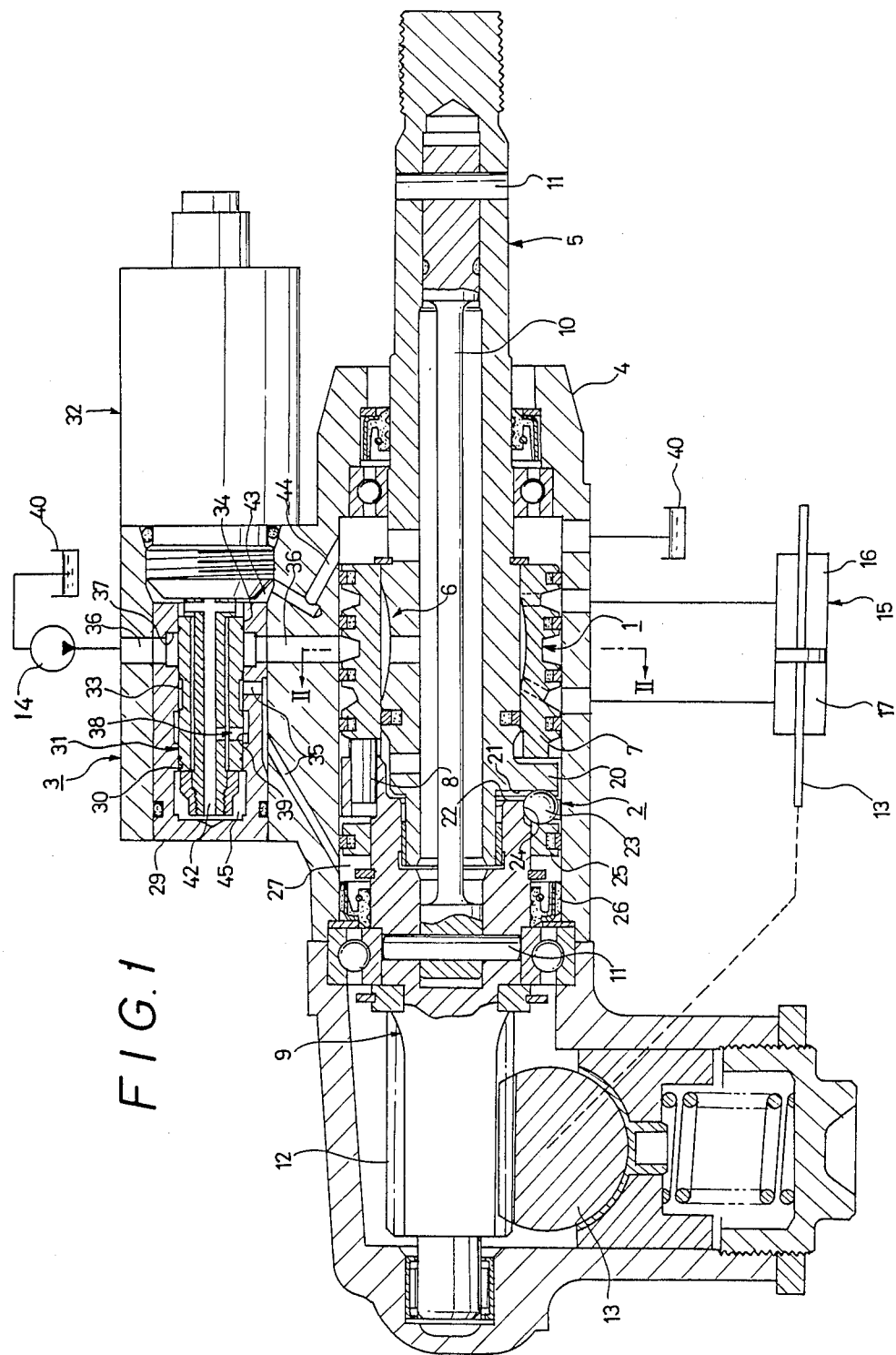
FIG. 1 is a longitudinal section of one embodiment of the invention.

Referring to the drawings, several embodiments of the invention will now be described. Referring to FIG. 1, a power steering apparatus generally comprises a servo valve 1 for controlling the distribution of an oil pressure from a discharge port of a pump to a power cylinder through a relative rotation of a pair of valve members, a reaction mechanism 2 for producing a steering reaction in accordance with an oil pressure supplied to an oil pressure reaction chamber, and a pressure controlling mechanism 3 for controlling the oil pressure which is supplied to the reaction chamber.

The servo valve 1 comprises a first valve member 6 formed integrally with an input shaft 5 which is rotatably journalled in a housing 4, and a cylindrical, second valve member 7 which is fitted outside the first valve member 6. The first valve member 6 is mechanically coupled to a steering wheel, not shown, through the input shaft while the second valve member 7 is mechanically coupled to an output shaft 9 through a connecting pin 8.

The free end of the input shaft 5 is rotatably fitted into the right-hand axial end of the output shaft 9. A torsion bar 10 extends across axial portions of the input shaft 5 and the output shaft 9, and has its each end connected to the input shaft 5 and the output shaft 9, respectively, by means of connecting pins 8, thus allowing the relative rotation between the input shaft 5 and the output shaft 9. In this manner, the pair of valve members 6, 7 are rotatable relative to each other. The output shaft 9 is formed with a pinion 12 which in turn meshes with a rack 13, and the output shaft is thence coupled to steerable load wheels, not shown, through the rack 13.

Figure 2:
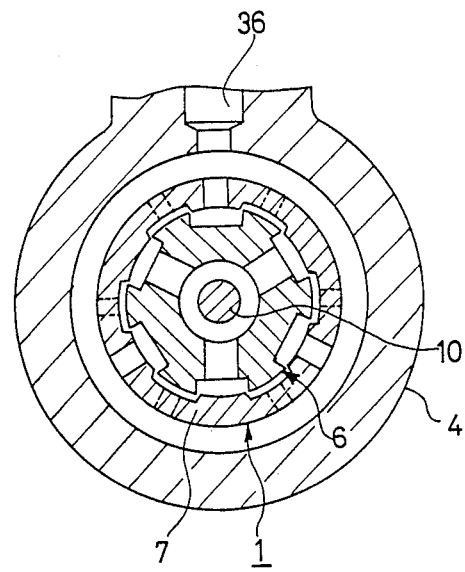
FIG. 2 is a cross section taken along the line II—II shown in FIG. 1.

The servo valve 1 is formed as a rotary servo valve which is in itself known in the prior art (see FIG. 2), operating to control the distribution of a pressure oil from a pump 14 to pressure chambers 16, 17 of a power cylinder unit 15 which is operatively associated with the rack 13, depending on the direction of relative rotation of the pair of valve members 6, 7.

Figure 3A:
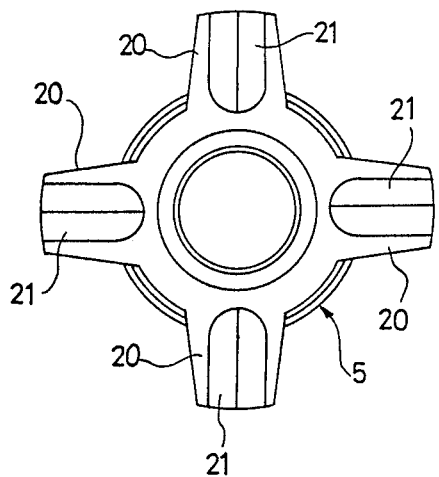
FIG. 3a is a left-hand side elevation of FIG. 3b.
Figure 3B:
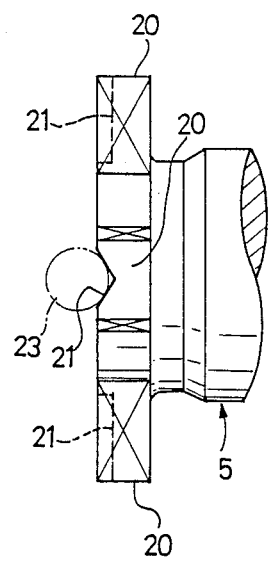
FIG. 3b is a front view of an end of an input shaft 5 which forms a reaction mechanism 2.

As shown in FIGS. 3a and 3b, the reaction member 2 comprises radially extending receivers 20 located around the left end of the input shaft 5 and circumferentially spaced apart by 90°, and V-grooves 21 formed in the left end face of each receiver 20 to extend in the radial direction. Also referring to FIGS. 4a and 4b, a cruciform groove 22 is formed in the right end face of the output shaft 9 for receiving the receivers 20 as a loose fit, and the right end of the output shaft 9 is also formed with axially extending bores 24 for supporting balls 23 on the end of each section of the cruciform groove 22 in an axially displaceable manner.

It will be noted that each ball 23 projects beyond the opposite end faces of the bore 24, with its right end face engaging the V-groove 21 formed in the receiver 20 which is loosely fitted in the cruciform groove 22 and the left end face disposed in abutment against the right end face of a pushing piston 25 which is slidably fitted in the housing 4. An oil pressure reaction chamber 27 is defined to the left of the piston 25 between the piston and a seal member 26 which is fitted into the housing 4.

Accordingly, when an oil pressure is introduced into the reaction chamber 27, the piston 25 is urged to the right, causing the balls 23 to abut against the V-grooves 21, thus acting to achieve a centering of the V-grooves 21 formed in the input shaft 5 with respect to the balls 23 located on the output shaft 9. As a consequence, the input shaft 5 and the output shaft 9 are normally maintained in their neutral positions with a force of a magnitude which depends on the magnitude of the oil pressure introduced into the reaction chamber 27.

It is to be understood that the reaction mechanism 2 is not limited to the one described above, but may be replaced by any known suitable reaction mechanism.

Referring to FIG. 1, the pressure controlling mechanism 3 comprises a cylindrical member 29 having a closed bottom which is a press fit into the housing 4, a spool valve 31 slidably fitted into an axial bore 30 formed inside the cylindrical member 29 and a solenoid 32 connected to the spool valve 31 for causing a reciprocating displacement thereof. The solenoid 32 is energized with a current controlled by a controller which is responsive to detection signals from a vehicle speed sensor and a steering angle sensor, all of which are not shown. In this manner, the reciprocating displacement of the spool valve 31 can be controlled in accordance with such signals.

Around its external peripheral surface, the spool valve 31 is formed with a distribution passage 33 including an annular groove and a pair of inwardly tapered surfaces which are formed on the opposite sides of the annular groove. Irrespective of the position of the spool valve 31 which it assumes during its reciprocating displacement, the distribution passage 33 normally communicates with a reaction passage 35, which opens into a surface 34 of the housing against which the spool valve 31 slides, and the reaction passage 35 is in communication with the oil pressure reaction chamber 27.

A feed passage 36 communicates with a discharge port of the pump 14, and opens into the sliding surface 34 through an annular groove 37 which is formed along the internal peripheral surface of the bore 30 which forms part of the feed passage 36. It will be noted that the annular groove 37 is located to the right of the distribution passage 33, but can be brought into overlying relationship therewith. Another annular groove 39, which forms part of a discharge passage 38, is formed to the left of the distribution passage 33, but is located to be brought into overlying relationship therewith. The discharge passage 38 communicates with a tank 40 associated with the pump 14. The feed passage 36 normally communicates with the servo valve 1 mentioned above through the annular groove 37.

When the solenoid 32 is deenergized, the spool valve 31 is maintained in its left-most end position by an internal spring within the solenoid 32, not shown, and under this condition, the channel area between the distribution passage 33 and the feed passage 36 or the channel area between the oil pressure reaction chamber 27 and the feed passage 36 is substantially equal to zero while the channel area between the distribution passage 33 and the discharge passage 38 or the channel area between the oil pressure reaction chamber 27 and the discharge passage 38 is at its maximum. Accordingly, the pressure within the reaction chamber 27 is substantially equal to zero at this time, minimizing the steering reaction which is transmitted from the reaction mechanism 2 to a steering wheel.

By contrast, when the solenoid 32 is energized to displace the spool valve 31 to the right, the channel between the distribution passage 33 and the feed passage 36 or that between the reaction chamber 27 and the feed passage 36 increases in accordance with the magnitude of such displacement to the right while at the same time the channel area between the distribution passage 33 and the discharge passage 38 or that between the reaction chamber 27 and the discharge passage 38 decreases, with consequence that the pressure within the reaction chamber 27 increases, increasing the steering reaction which is transmitted from the reaction mechanism 2 to the steering wheel.

The discharge passage 38 communicates through an internal path 42 formed inside the spool valve 31 with a low pressure chamber 43 which is defined at the right end of the spool valve 31, and communicates thence through a path 44 formed in the housing 4 with the discharge side of the servo valve 1, thus eventually communicating with the tank 40 associated with the pump 14. Another low pressure chamber 45 is defined at the left end of the spool valve 31, and communicates with the internal path 42 in the spool valve 31, whereby it communicates with the tank 40 associated with the pump 14.

With the described arrangement, when a steering wheel, not shown, is operated, there occurs a relative rotating displacement between the valve members 6, 7 of the rotary servo valve 1, depending on the direction of rotation of the wheel, and such relative displacement acts to feed a pressure to one of the pressure chambers 16, 17 in the power cylinder unit 15, thus applying an assisting power to the rack 13.

At this time, the current which energizes the solenoid 32 is controlled in accordance with a running condition of a vehicle. For example, when the vehicle is running at a low speed, the spool valve 31 is at its left-most end position or slightly displaced to the right thereof. Accordingly the pressure within the reaction chamber 27 is maintained to be zero or at a very small value, reducing the steering reaction which is transmitted to the reaction mechanism 2 to the steering wheel to permit a light wheel operation.

By contrast, when the vehicle is running at a high speed, the energizing current of the solenoid 32 increases to cause the spool valve 31 to be displaced through a greater stroke to the right, whereby the pressure within the reaction chamber 27 increases to increase the steering reaction which is transmitted from the reaction mechanism 2 to the steering wheel, enabling a stabilized wheel operation which is more heavily loaded than before.

FIG. 5 shows another embodiment of the invention. While the pressure within the reaction chamber 27 is established to be zero when the spool valve 31 is displaced to the left as a result of deenergization of the solenoid 32 in the first mentioned embodiment, a pressure controlling mechanism 103 of this embodiment is designed to increase the pressure within the reaction chamber when a spool valve 131 is displaced to the left as a result of the deenergization of a solenoid 132.

In this embodiment, a cylindrical member 129, which corresponds to the cylindrical member 29, is fitted into a housing 104 and is urged by a spring 151 to abut against the casing of the solenoid 132, whereby the member 129 is prevented from being displaced from such position. The cylindrical member 129 is formed with an axial bore 130 extending therethrough, with a spool valve 131 connected to the solenoid 132 slidably extending therethrough.

Around its external peripheral surface, the spool valve 131 is formed with a distribution passage 133 comprising an annular groove 152 and a land 153 located to the left thereof, with the land 153 being formed with tapered surfaces on its opposite sides. A feed passage 136 communicating with the discharge port of a pump, a reaction passage 135 communicating with an oil pressure reaction chamber and a discharge passage 138 communicating with a tank are sequentially disposed from right to left, as viewed in the axial direction of the spool valve 131.

The feed passage 136 and the reaction passage 135 open into a surface 134 of the housing 104 against which the spool valve 131 slides, from the side of the housing 104. The discharge passage 138 opens into the sliding surface 134 from the side of the spool valve 131 at a location adjacent to the land 153 of the distribution passage 133. A pair of low pressure chambers 143, 145 are formed on the opposite sides of the spool valve 131 and communicate with the tank through the discharge passage 138.

Accordingly, in this embodiment, under the condition shown in which the solenoid 132 is deenergized and the spool valve 131 is located at its left-most end position, the channel area between the feed passage 136 and the reaction passage 135 communicating with an oil pressure reaction chamber through the distribution passage 133 is at its maximum while the channel area between the reaction passage 135 and the discharge passage 138 through the distribution passage 133 is at its minimum, providing a maximum pressure which is introduced into the oil pressure reaction chamber.

When the solenoid 132 is energized and the spool valve 131 is displaced to the right, the channel area between the reaction passage 135 and the feed passage 136 is reduced in accordance with the magnitude of such displacement to the right while the channel area between the reaction passage 135 and the discharge passage 138 increases, thus reducing the pressure within the reaction chamber.

It will be noted that the feed passage 36 or 136 which provides a communication between the pressure controlling mechanism 3 or 103 and the servo valve 1 may be provided with a fixed orifice in order to develop a pressure upstream of the fixed orifice when the power steering apparatus is inoperative, with such pressure being introduced into the oil pressure reaction chamber through the pressure controlling mechanism 3 or 103. With this arrangement, a steering reaction may be applied to a steering wheel when the power steering apparatus is not operated. It is desirable that the fixed orifice be designed to permit an adjustment of the channel area externally of the housing 4 or 104.

While the invention has been disclosed above in connection with several embodiments thereof, it should be understood that a number of changes, modifications and substitutions thereof will readily occur to one skilled in the art from the above disclosure without departing from the spirit and scope of the invention defined by the appended claims.

What is claimed is:

1. A steering force controller for power steering apparatus including a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber and a pressure controlling mechanism for controlling the oil pressure which is supplied to the oil pressure reaction chamber;

the pressure controlling mechanism comprising a spool valve slidably fitted in an internal bore within a housing, a solenoid connected to the spool valve for causing a reciprocating displacement thereof, a pair of low pressure chambers formed at the opposite ends of the spool valve and communicating with a tank associated with the pump, a distribution passage formed around an external peripheral surface of the spool valve, a feed passage opening into a surface of the housing against which the spool valve slides and communicating with the discharge port of the pump, a reaction passage opening into the sliding surface and communicating with the oil pressure reaction chamber, and a discharge passage opening into the sliding surface and communicating with the tank, the feed passage and the reaction passage and the discharge passage opening into the sliding surface in a sequential order as viewed in the axial direction of the spool valve, the distribution passage being effective to increase a channel area between the reaction passage and the feed passage and to reduce a channel area between the reaction passage and the discharge passage in accordance with a displacement of the spool valve in one direction by the solenoid.

2. A steering force controller according to claim 1 in which in the inoperative position of the spool valve when the solenoid is deenergized, the channel area between the reaction passage and the feed passage is at its minimum while the channel area between the reaction passage and the discharge passage is at its maximum.

3. A steering force controller according to claim 1 in which in the inoperative position of the spool valve when the solenoid is deenergized, the channel area between the reaction passage and the feed passage is at its maximum while the channel area between the reaction passage and the discharge passage is at its minimum.

4. A steering force controller for power steering apparatus including a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber and a pressure controlling mechanism for controlling the oil pressure which is supplied to the oil pressure reaction chamber;

the pressure controlling mechanism comprising a spool valve slidably fitted in an internal bore within a housing, a solenoid connected to the spool valve for causing a reciprocating displacement thereof, a pair of low pressure chambers formed at the opposite ends of the spool valve and communicating with a tank associated with the pump, a distribution passage formed around an external peripheral surface of the spool valve, a feed passage opening into a surface of the housing against which the spool valve slides and communicating with the discharge port of the pump, a reaction passage opening into the sliding surface and communicating with the oil pressure reaction chamber, and a discharge passage opening into the sliding surface and communicating with the tank, the feed passage and the reaction passage and the discharge passage opening into the sliding surface in a sequential order as viewed in the axial direction of the spool valve, the distribution passage being effective to increase a channel area between the reaction passage and the feed passage and to reduce a channel area between the reaction passage and the discharge passage in accordance with a displacement of the spool valve in one direction by the solenoid, in which the feed passage and the reaction passage and the discharge passage open into the sliding surface from the housing side, respectively, and in which the distribution passage which is formed around the external peripheral surface of the spool valve communicates with the reaction passage and also extends to the opposite sides of the reaction passage as viewed in the axial direction thereof where it opens, and in which one side of the opening of the distribution passage can be brought into overlying relationship with the feed passage while the other side of the opening can be brought into overlying relationship with the discharge passage.

5. A steering force controller for power steering apparatus including a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber and a pressure controlling mechanism for controlling the oil pressure which is supplied to the oil pressure reaction chamber;

the pressure controlling mechanism comprising a spool valve slidably fitted in an internal bore within a housing, a solenoid connected to the spool valve for causing a reciprocating displacement thereof, a pair of low pressure chambers formed at the opposite ends of the spool valve and communicating with a tank associated with the pump, a distribution passage formed around an external peripheral surface of the spool valve, a feed passage opening into a surface of the housing against which the spool valve slides and communicating with the discharge port of the pump, a reaction passage opening into the sliding surface and communicating with the oil pressure reaction chamber, and a discharge passage opening into the sliding surface and communicating with the tank, the feed passage and the reaction passage and the discharge passage opening into the sliding surface in a sequential order as viewed in the axial direction of the spool valve, the distribution passage being effective to increase a channel area between the reaction passage and the feed passage and to reduce a channel area between the reaction passage and the discharge passage in accordance with a displacement of the spool valve in on direction by the solenoid, in which the feed passage and the reaction passage open into the sliding surface from the housing side, and in which the discharge passage is formed around the external peripheral surface of the spool valve together with the distribution passage, the distribution passage comprising an annular groove which provides a communication between the feed passage and the reaction passage, and a land which limits a communication between the reaction passage and the discharge passage.

6. A steering force controller for power steering apparatus including a servo valve for controlling the distribution of an oil pressure from a discharge port of a pump to a power cylinder through a relative rotation of a pair of valve members, a reaction mechanism for producing a steering reaction in accordance with an oil pressure supplied to an oil pressure reaction chamber and a pressure controlling mechanism for controlling the oil pressure which is supplied to the oil pressure reaction chamber;

the pressure controlling mechanism comprising a spool valve slidably fitted in an internal bore within a housing, a solenoid connected to the spool valve for causing a reciprocating displacement thereof, a pair of low pressure chambers formed at the opposite ends of the spool valve and communicating with a tank associated with the pump, a distribution passage formed around an external peripheral surface of the spool valve, a feed passage opening into a surface of the housing against which the spool valve slides and communicating with the discharge port of the pump, a reaction passage opening into the sliding surface and communicating with the oil pressure reaction chamber, and a discharge passage opening into the sliding surface and communicating with the tank, the feed passage and the reaction passage and the discharge passage opening into the sliding surface in a sequential order as viewed in the axial direction of the spool valve, the distribution passage being effective to increase a channel area between the reaction passage and the feed passage and to reduce a channel area between the reaction passage and the discharge passage in accordance with a displacement of the spool valve in one direction by the solenoid, in which the low pressure chambers formed at the opposite ends of the spool valve communicate with each other through an internal path formed to extend axially through the spool valve, the internal path communicating with the discharge passage which opens into the sliding surface.

* * * * *

UNITED STATES PATENT AND TRADEMARK OFFICE
CERTIFICATE OF CORRECTION

PATENT NO. : 4 790 401
DATED : December 13, 1988
INVENTOR(S) : Hirotetu SONODA

It is certified that error appears in the above-identified patent and that said Letters Patent is hereby corrected as shown below:

Col. 8, Line 62; change "on" to ---one---.

Signed and Sealed this

Sixteenth Day of May, 1989

Attest:

DONALD J. QUIGG

Attesting Officer

Commissioner of Patents and Trademarks